March 27, 1951     L. W. NIJBOER     2,546,650
FILTRATION THROUGH LOOSE FILTER MATERIAL
Filed July 14, 1947
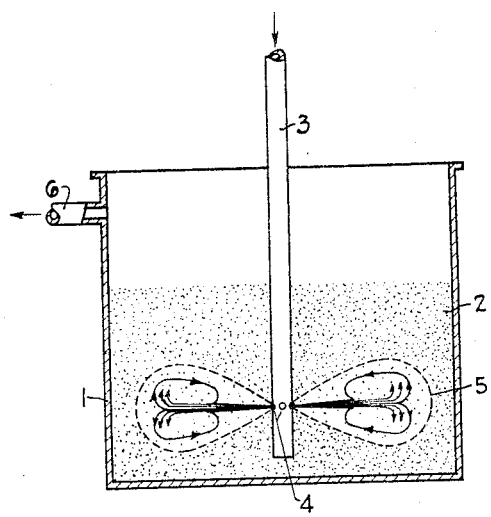
Inventor:
Lambert W. Nijboer
By his Attorney:

Patented Mar. 27, 1951

2,546,650

UNITED STATES PATENT OFFICE 2,546,650

FILTRATION THROUGH LOOSE FILTER MATERIAL

Lambert W. Nijboer, Amsterdam, Netherlands, assignor to Shell Development Company, San Francisco, Calif., a corporation of Delaware Application July 14, 1947, Serial No. 760,905
In the Netherlands April 9, 1941

Section 1, Public Law 690, August 8, 1946
Patent expires April 9, 1961

7 Claims. (Cl. 210—124)

This invention relates to the filtration of liquids by means of filter material in a finely distributed state, such as particles in granular or powdery form. An example of such filtration is the filtration of water by means of sand or other loose, granular materials.

With the usual filtration methods using beds of sand as the filter medium a limited part of the sand constantly comes into contact with the feed liquid; this part becomes silted or polluted or/and clogged in a short time so that it becomes necessary to clean it, for instance, by backwashing or by scraping the silted surface or by replacing the silted sand. These cleaning operations necessitate frequent interruptions of the filtering.

It is an object of this invention to provide an improved filtration method in which a given quantity of loose filter material in a finely divided state can be used for filtering a liquid for a longer period of time without cleaning or replacement of the filter material than is possible with the usual methods.

It is a further object to provide an improved filtration method of the type described in which the mass of filter material is agitated near the point of introduction of the raw liquid to be filtered, whereby better use is made of the filter material and different portions of it are first brought into contact with the raw liquid as the filtration proceeds.

According to the present invention the aforesaid difficulties are obviated by forcing the raw liquid to be filtered under constant or varying pressure through a suitable conduit into the interior of a mass of loosely grained filter material under such conditions that a part of the filter material together with the liquid are maintained in a turbulent motion, e. g., a whirling motion. The rate at which the liquid is introduced into the mass of filter material is preferably kept within certain limits, depending upon the natures of the filter material and of the liquid and possibly other conditions, such as temperature. A layer or bed of filtering material in a state of rest must exist around the turbulently moving particles of filter material to insure the filtration proper. The border layer of filter material between the turbulently moving particles and the particles in the stationary bed is not in a state of rest; as a result, there is no tendency towards deposition of a layer of silt at the border. This border may shift its position under the influence of changes of pressure, and it is also possible to vary the point of introduction of the raw liquid, either continuously or intermittently, for the purpose of shifting the border with respect to the mass.

In the preferred embodiment, the method involves altering the rate of flow of liquid into the filter bed and/or the point of introduction of the liquid so that the layer or surface at which the impurities removed from the raw liquid are deposited is continually changed, either continuously or intermittently; the invention may, however, also be practiced without such change.

The invention will be understood more completely by reference to the drawing forming a part of this specification, the single figure of which is a vertical cross-sectional view illustrating schematically a simple apparatus by means of which the method according to the invention can be carried out.

The apparatus comprises a tank or vessel 1 of any convenient shape, e. g., circular or rectangular. In the case of water filtration plants the tank would be constructed of concrete and provided with a false bottom, as is well known in the art. The tank is partially filled with sand 2, and is provided with a vertical pipe or tube 3 connected to a source of raw liquid to be filtered. The tube 3 may be connected to a constant pressure feed device or to a pump, not shown, and may be rigidly mounted in the position shown, or provided with suitable means, not shown, for moving it in a horizontal and/or vertical direction. The tube 3 is closed at the bottom but has lateral apertures 4 which may be fitted with nozzles if desired. The raw liquid is forced under pressure through the tube and emerges from the apertures 4 at such a linear velocity that the particles of filter material in the vicinity of the apertures are agitated and whirling masses of liquid with filter particles suspended therein are formed. The circumference of the whirling mass is indicated by the dotted line 5. Within these whirling masses flow of the suspension takes place in the direction indicated by the arrows. It is evident that per unit of time the same quantity of liquid passes through the surface indicated by the dotted line 5 into the mass of filter material which has remained stationary as it flowed through the tube 3. The liquid which has passed through the filter bed leaves the apparatus by any suitable means, such as an outlet 6 formed in the side wall of the vessel.

During the filtration the deposition of impurities removed from the liquid takes place mainly at the boundary between the whirling and the stationary mass, whereby a part of the removed impurities is again brought into suspension into the whirling mass and the impurities accumulate there. Since the volume of the whirling mass is dependent, inter alia, upon the rate of flow of the liquid (i. e., volume per unit time, or mass velocity as opposed to linear velocity), the position of the boundary 5 can be changed by altering the rate of feed of the liquid which also affects the linear velocity of flow through the apertures. This is preferably effected so that the boundary is displaced outwardly from the aperture 4 as the filtration progresses. If a portion of the filter material is saturated or clogged with impurities a fresh whirling mass can be set up, if desired at another point within the filter bed. This may be effected in any desired manner, as by providing a plurality of tubes 3 and changing the flow of water from tube to tube; or by displacing the tube 3, which displacement can be effected either continuously or intermittently. It is, of course, possible to maintain several whirling masses in the same filter bed by feeding liquid simultaneously to several tubes, but it is desirable in this case to space the tubes supplied with liquid so that their whirling masses are separated by an intervening body of filter material in a state of rest.

In certain types of filtering operations it is desirable to maintain the filter bed under superatmospheric pressure or at a vacuum. For this purpose the top of the vessel 1 may be closed. The pressure may then be varied at will, and may remain constant or may be varied during the filtering operation.

From the foregoing it is evident that, by proceeding according to this method, a greater quantity of liquid can be filtered by a given quantity of filter material before it must be taken out of operation for cleaning than is possible by the usual filtration methods.

As examples of filter materials which may be used in this method in lieu of the sand previously described, the following may be mentioned: granulated marble, granulated bauxite, granulated pumice stone, phosphate flour, comminuted metal or metal filings, granulated fuller's earth, ground glass, silica gel, pulverized coke, bone black, and activated charcoal. Many of these substances act upon the liquid not only by filtering out suspended solids and other suspended matter, but purify it or otherwise alter its properties by adsorption and chemical reaction; for example, bactericidal action as well as deodorization and decolorization may be effected. These substances and others like them are composed predominantly of particles in granular or powdery form and exert a filtering action upon the liquid flowed through them, regardless of whether they bring about other desirable effects.

I claim as my invention:

1. A method for filtering liquids by means of a mass of filter material in a finely divided state, comprising the steps of confining a mass of said filter material loosely within a vessel with the bulk thereof in a state of rest; introducing raw liquid to be filtered through a conduit to a point in the interior of said mass; discharging said raw liquid at said point under pressure against the interior of said mass at a high flow velocity to agitate the part of said material within a restricted zone in the vicinity of said point, thereby imparting turbulence to the finely divided filter particles and forming a suspension of said particles in the liquid within said restricted zone, the mass velocity of the raw liquid introduced being insufficient to disturb the filter material beyond said restricted zone from its state of rest; flowing the liquid from said restricted zone through at least a part of the mass of filter material which is in a state of rest; withdrawing liquid from said mass after said flow and varying the boundary between said restricted zone and the mass of filter material and thereby setting up a fresh boundary containing filter material through which the liquid enters the mass of filter material which is in a state of rest by varying the flow of liquid from said discharge point during said filtration.

2. The method according to claim 1 in which the said boundary is varied by altering the point within the mass of filter material at which the liquid is introduced during the filtering operation.

3. The method according to claim 1 in which the said boundary is varied by changing the mass velocity of the liquid during the filtering operation.

4. The method according to claim 3 in which the mass velocity of the liquid is increased during the filtering operation, whereby the volume occupied by the turbulent mass is progressively increased.

5. The method according to claim 3 in which the point within the mass of filter material at which the liquid is introduced is altered during the filtration operation.

6. A method of filtering liquids comprising the steps of confining a body of filter material in a finely subdivided state loosely within a confined space comprising a quiescent zone and a turbulent zone; maintaining the part of said body of filter material in the quiescent zone in a state of rest; continuously flowing raw liquid to be filtered through said turbulent zone and forming therein a suspension of said filter material in the liquid; continuously flowing liquid from said turbulent zone through the filter material in said quiescent zone and filtering out impurities in a layer within said quiescent zone near the boundary between said zones; and varying the layer at which said impurities are removed by altering the flow of said suspension into the turbulent zone thereby setting up a new boundary containing filter material between said zones during said filtration.

7. The method according to claim 6 wherein said boundary is varied continuously during the filtration.

LAMBERT W. NIJBOER.

REFERENCES CITED

The following references are of record in the file of this patent:

UNITED STATES PATENTS

| Number | Name | Date |
|---|---|---|
| 455,527 | Bowden | July 7, 1891 |
| 538,875 | Lorey | May 7, 1895 |
| 648,105 | Greer | Apr. 24, 1900 |
| 1,480,091 | Meredith | Jan. 8, 1924 |
| 2,209,602 | Jewell | July 30, 1940 |